CASE OR BOX FOR RADIOSONDE CIRCUITRY

Filed May 8, 1956

INVENTORS

JAMES R. COSBY
WILLIAM K. BOETTINGER

BY K. G. Doub

ATTORNEY

INVENTORS
JAMES R. COSBY
WILLIAM K. BOETTINGER
BY K. G. Doub
ATTORNEY

Sept. 13, 1960 J. R. COSBY ET AL 2,952,843

CASE OR BOX FOR RADIOSONDE CIRCUITRY

Filed May 8, 1956 4 Sheets-Sheet 3

INVENTORS
JAMES R. COSBY
WILLIAM K. BOETTINGER
BY K. G. Doub
ATTORNEY

CASE OR BOX FOR RADIOSONDE CIRCUITRY

Filed May 8, 1956 4 Sheets-Sheet 4

INVENTORS
JAMES R. COSBY
WILLIAM K. BOETTINGER
BY K. G. Doub
ATTORNEY

United States Patent Office 2,952,843

Patented Sept. 13, 1960

2,952,843

CASE OR BOX FOR RADIOSONDE CIRCUITRY

James R. Cosby, Towson, and William K. Boettinger, Baltimore, Md., assignors to Bendix Aviation Corporation, Baltimore, Md., a corporation of Delaware Filed May 8, 1956, Ser. No. 583,518

2 Claims. (Cl. 340—345)

This invention relates to upper-air sounding apparatus technically known as radiosondes; it is concerned primarily with improvements in the case or box for receiving and storing the radio telemetering circuitry and associated components. In the type of radiosonde most widely used throughout the world and particularly the United States, a radio frequency oscillator coupled to a radio transmitting antenna puts out a carrier wave which is modulated in accordance with the relaxation oscillation frequency of a second oscillator whose relaxation rate is rendered variable as a function of the condition or conditions being sensed. The signals transmitted by the modulated carrier wave are received and translated into visual data by suitable ground station equipment. The transmission frequency may vary, depending upon conditions of use. For example, in radiosondes for shipboard use, a 72 megacycle radio frequency transmitter may be specified since the transmitting and receiving equipment can be made much simpler and less bulky; also there is less chance of interference with commercial radio and television broadcast bands due to remoteness of receiving and transmitting stations, and requirements for obtaining data on wind direction and speed are sacrificed in favor of simplicity. For use on land, higher frequencies are generally specified, because the ground stations are not restricted as to size and space, and when wind direction finders are required, the sharper receiving-antenna beam which results from higher frequencies ensures against interference from surface reflection as the beam swings toward ground level. At the higher frequencies, less interference may result if the audio frequency oscillator and the radio frequency oscillator are made and assembled as separate sections. In certain types of radiosondes, both the audio section and radio frequency section are mounted in the case or box during flight and suitably shielded against electrical interference one from the other; in other types, the audio section is mounted in the box and the radio frequency section assembled in a housing which is suspended from the box or case during flight; while in still other types the audio section and radio frequency section are assembled in a common housing which is suspended from the box.

Since radiosondes are required in large quantities and are considered a dispensable item, it becomes mandatory to produce them at a low cost. This, of course, means mass production on an assembly line or lines, and manufacture becomes more complicated when different types of radiosondes are to be produced in quantity.

Although the radiosonde is considered a dispensable item, a certain percentage are found by civilians following flight, in which event the finder is requested to return the radiosonde at the expense of the owner, which is usually a Government agency. To encourage return of the recovered instruments, the case or box is specially constructed to facilitate proper storage of the components within the box and directions are printed on the box informing the finder how to best prepare the unit for return shipment with the least likelihood of damage to the components.

One of the objects of the present invention is to provide a radiosonde case or box common to different types of telemetering circuitry, or which will comply with specifications for different types of telemetering circuitry subject to only minor modifications, so that all types may be produced on a basic production line, simultaneously. More specifically, to provide a compact, light-weight box which will accommodate circuitry to the mutual advantage of the associated components during flight in which (*a*) the audio frequency oscillator and the radio frequency oscillator are made and assembled as a single unit on a common base, or (*b*) the audio frequency and radio frequency sections are made and assembled as separate units and housed within the box duing flight, or (*c*) the radio frequency section is made as a separate unit either with or without the audio frequency section and detachably connected to and suspended from the exterior of the box during flight; and in each instance provision is made to facilitate effective and safe disposition of the respective components during shipment and storage prior to flight, and also in the event of a finder recovering and returning an instrument following flight.

Another object is to provide a radiosonde case or box having adjoining compartments for receiving the audio frequency section and the supply battery, said compartments being so partitioned and provided with a common door or cover as to not only effectively utilize the heat given off by the battery during flight and thereby minimize the effects of extremely low temperatures on the audio frequency section but to also receive the radio frequency section for safe shipment and storage prior to flight as well as in the event of recovery and return shipment following a flight.

Another object is to provide in radiosondes of the type where the radio frequency section, or the entire transmitter including both the audio frequency and radio frequency sections, is required to be mounted in a housing suspended from the case or box during flight, means whereby said housing may be readily connected to or removed from the box and which at the same time effectively seals the housing against entrance of moisture during flight.

A further object is to improve the duct system for radiosonde cases or boxes of the type with which the present invention is concerned. By "duct system" is meant the main duct in which the humidity and temperature elements are mounted and the auxiliary ventilating duct which parallels the main duct and functions to shield the said elements against the effects of temperatures other than true ambient temperature.

An example of a radiosonde case over which the present invention constitutes an improvement is shown in Patent No. 2,604,582 to Hauck et al.

The foregoing and other objects and advantages will become apparent in view of the following description taken in conjunction with the drawings, wherein.

Figures 1, 2:
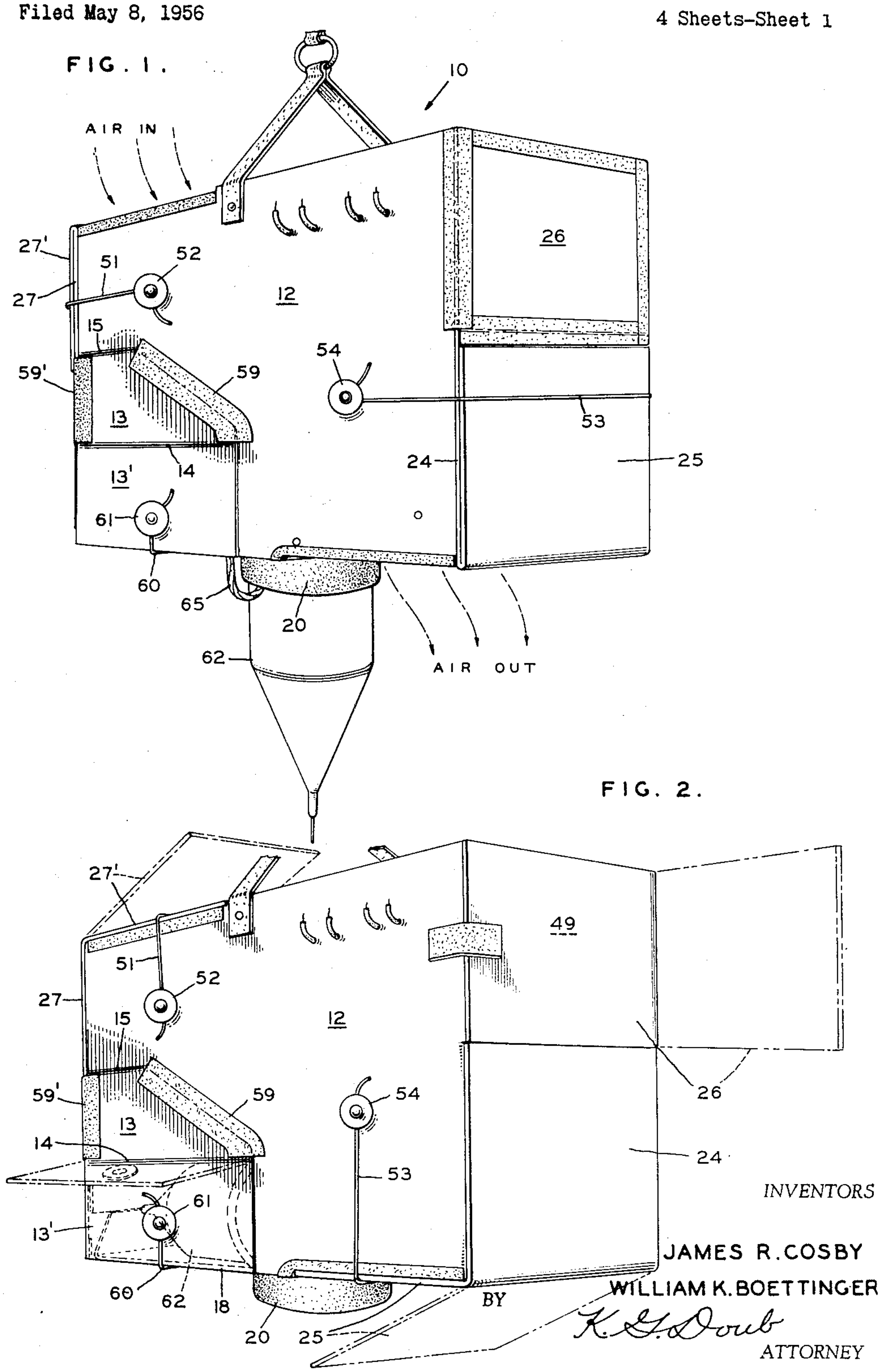
Figure 1 is a view in perspective of a radiosonde utilizing a case or box constructed in accordance with the instant invention, the instrument being shown readied for flight.
Figure 2 is a view similar to Figure 1 but showing the instrument conditioned for shipment and storage, the tubular transmitter housing being removed and placed in what served as the battery compartment during flight.
Figure 3:
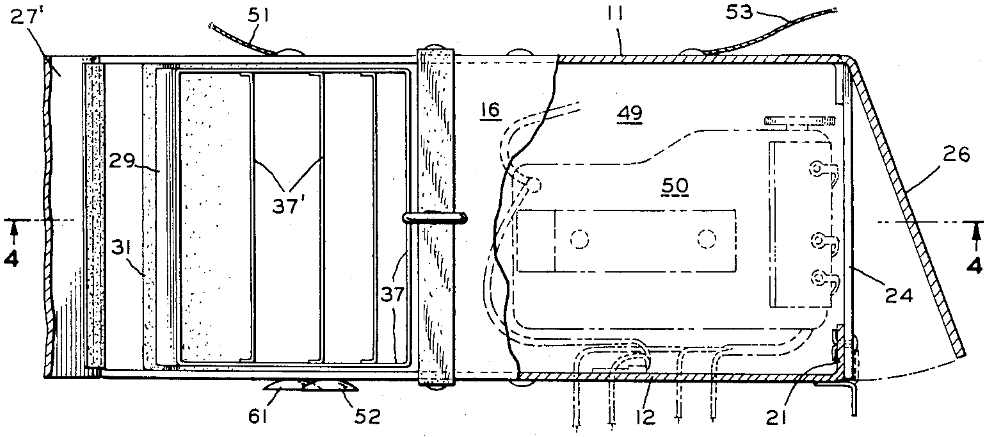
Figure 3 is a top plan view of Fig. 2 with the top wall of the baroswitch compartment partly broken away and the top door open to show the intake to the main and auxiliary ducts.
Figure 7:
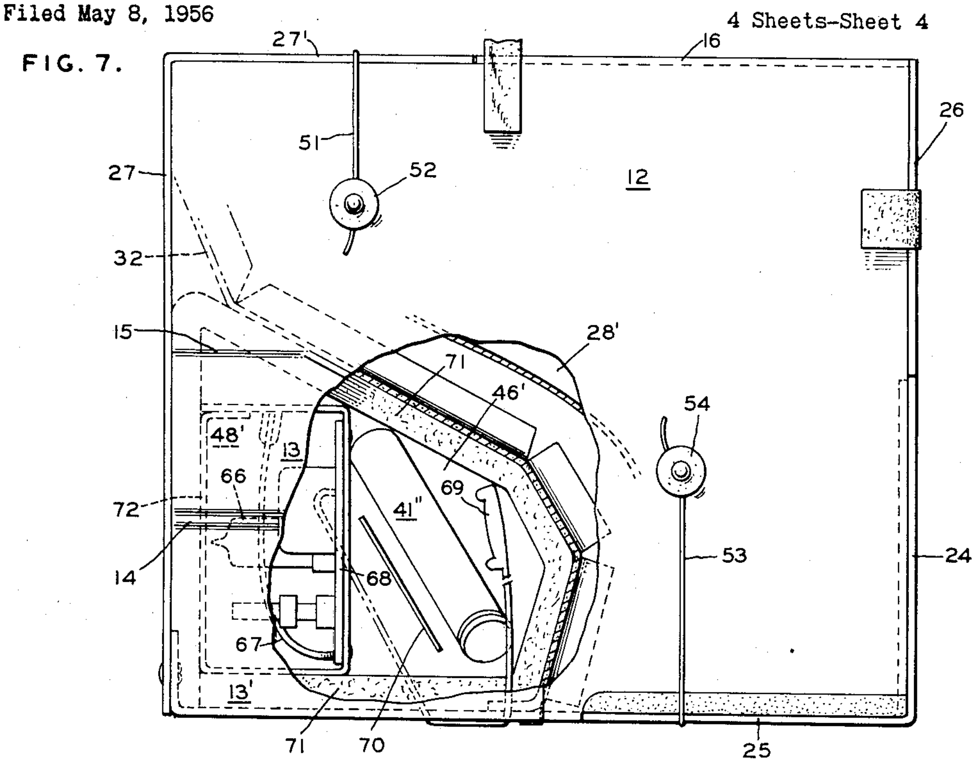
Figure 8:
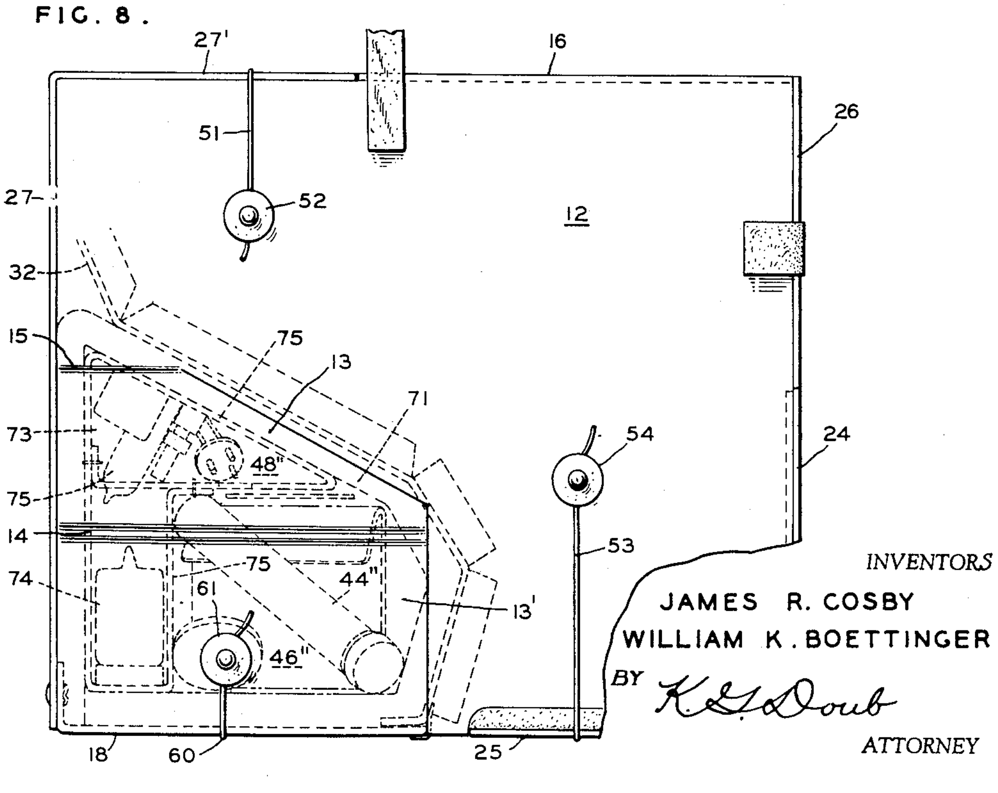

Figure 7 is a view in side elevation, partly broken away, of the radiosonde case of the preceding figures adapted for circuitry in which the audio frequency section and radio frequency section are assembled on a common base; and Figure 8 is a view in side elevation showing the case of the preceding figures adapted for circuitry in which the audio frequency section and the radio frequency section, indicated in dotted lines, are separate from one another but are mounted in the case at all times, as distinguished from radiosonde circuitry such as shown in Fig. 1, where the radio frequency section is mounted in a separate housing which is suspended from the case during flight.

The radiosonde shown in Figures 1 to 4, inclusive, is of that type wherein the audio frequency circuitry is assembled on a separate base or section and located within the box or case, while the radio frequency circuitry including the antenna is mounted in cone-ended cylindrical housing which is suspended from the bottom wall of the case. Irrespective of the particular arrangement or type of circuitry which is to be used, the box or case itself may be fabricated from a blank standard to all four types of radiosondes heretofore briefly described. The blank (Fig. 5) is preferably made of foldable material such as corrugated fibreboard coated on its outer side with a waterproofing and light-reflecting substance. Within the box are mounted a number of parts (Fig. 6) which make up the main duct and ventilating duct system.

Figure 4:
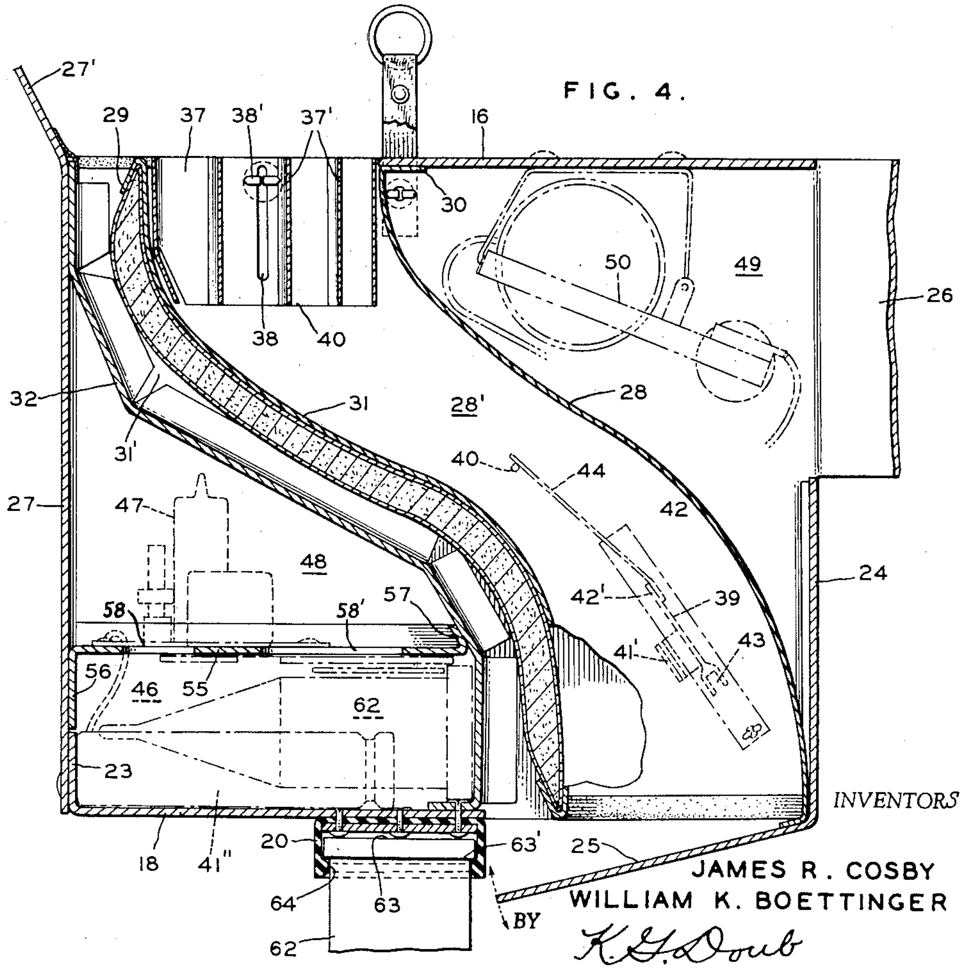
Figure 4 is a transverse section taken substantially on the line 4—4, Fig. 3.
Figures 5, 6:
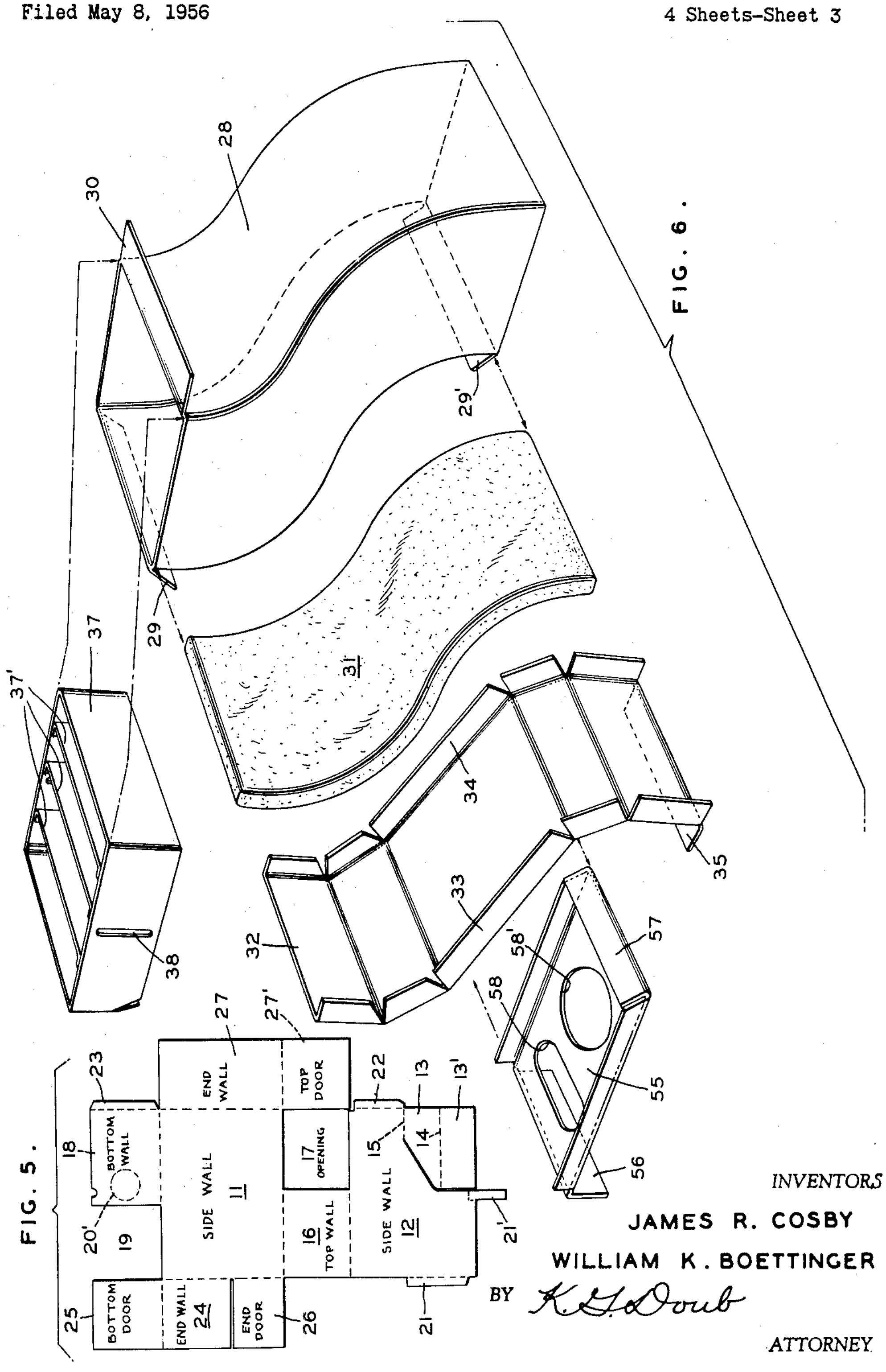
Figure 5 is a developed plan of the box blank prior to folding.
Figure 6 is an exploded perspective of the parts which make up the internal duct system plus the partition between the audio frequency section compartment and battery compartment.

Wherever the box or case is shown assembled, it is generally indicated at 10. The blank from which the box is formed is shown in Fig. 5 as it appears (inner side up) after having been stamped or cut and scored ready for folding; and here the opposite side walls are indicated at 11 and 12, the side 11 being referred to as the back wall and the side 12 as the front wall simply to conform to the position of the box as viewed in Figs. 1 to 4, inclusive. The front wall is provided with a compartment door 13 which is scored at 14 to define the hinge point of another compartment door 13' which, until and unless used, remains rigid with the door 13, in which event 13 and 13' form a single panel hinged at 15, all for a purpose to be more fully hereinafter described. The top wall of the box is indicated at 16; it is formed with a cutout portion defining an opening 17 for the duct system. The bottom wall is indicated at 18; it terminates short of the full length of the box to provide an exhaust opening 19 for the duct system. The dotted circle 20' in Fig. 5 outlines the point of attachment of the radio frequency section holder or support 20, to be described. The side wall 12 and the bottom wall 18 are provided with riveting or securing flaps 21, 21', 22 and 23. The front end wall is indicated at 24; it is scored to provide a bottom door 25 which is used to close the bottom exhaust opening 19 when the instrument is not in use. Adjacent and in alignment with the end wall 24, the blank is severed to provide a front end door 26, which hinges on a score line forming a continuation of the score line for the end wall 24. When the blank is folded, the door 26 hinges on the side wall 11; it provides a closure for the baroswitch compartment, note Fig. 4. The opposite or rear end wall is indicated at 27; it is scored and extended beyond the score line to provide a top door 27', which when the blank is folded provides a closure for the inlet 17 to the duct system when the instrument is not being used.

As the blank is viewed in Fig. 5, the inside of the box is up, and when the respective sections are folded on the score lines and the securing flaps connected to their adjacent walls, a box 10 of prismatic form is provided as shown in Figs. 1 to 4; also 7 and 8 with slight interior modification.

The parts shown in disassembled form in Fig. 6, with the exception of the partition member at the extreme left-hand side thereof, provide the duct system. Referring to this figure, the main duct 28' is defined by a curved open-ended box-shaped member 28, having flaps 29, 29' and 30 at its opposite ends. The flap 30 abuts the upper or top wall of the box and is secured thereto, while the flaps 29 and 29' are bent back over the opposite end edges of an insulation pad 31, which fits snugly against the rear wall of the member 28. This duct member may be made of cardboard or other suitable flexible material. Adjacent the insulation pad 31 and spaced therefrom to provide an auxiliary duct 31' there is disposed a panel 32 having a contour similar to that of the duct member 28, the side edges of the panel being notched and bent upwardly to provide securing flaps 33 and 34 which are pasted to the adjacent sides of the box. At the lower end of the panel 32 is another securing flap 35.

At the entrance to the main duct 28' there is located a radiation shield and air distributing section 37, having a series of air-directing partitions 37'. The opposite side walls of the section 37 are slotted, as at 38, to receive securing rivets 38'.

Within the main duct 28' is located a terminal board 39 adapted to support a temperature-sensing element or thermistor 40 and a humidity element 41. The terminal board 39 is removably held under friction in the proper location within the duct 28', and to accomplish this a pair of flat spring strips 42 are provided and each strip is secured at its opposite ends to the adjacent side wall of the duct so that its intermediate portion is bowed inwardly. This inwardly-bowed portion of each spring strip 42 is slotted longitudinally, as at 42', and the opposite edges of the terminal board slidingly engage in these slots. The upper edge of the terminal board abuts the upper ends of the slots, while the lower side edges of the board engage a pair of spring tongues 43, which are cut out of the flat spring member at this point. The thermistor 40 is supported between and wired to the upper free ends of a pair of conducting arms 44, which at their lower ends are secured to the terminal board and wired into the grid-to-ground circuit of the audio oscillator. The humidity element or hygroscopic resistor 41 is in the form of a flat non-conductive base strip coated with a hygroscopic salt and having edge electrodes frictionally engaged between a pair of spring terminal clips 41', which are also wired into the grid-to-ground circuit of the audio oscillator. The humidity element must be carefully shielded from the effects of moisture prior to actual use in flight, and hence it is sealed in a bottle or like air-tight container 41'', note Fig. 4.

It is important that the temperature and humidity elements sense the true ambient air temperature and humidity. Hence they must be effectively shielded from other parts which give off heat, such as a battery located at the compartment 46 of Fig. 4 as well as the audio section, shown in dotted lines at 47, which is located in the compartment 48; and this shielding function is performed by the auxiliary air-circulation passageway or duct 31' and the insulation pad 31. When the duct members 28 and 32 are fixed in the box as shown in Fig. 4, they divide the interior of the box into a pair of compartments, one of which is the compartment 48, above noted, and the other of which is the compartment 49 for receiving the baroswitch shown in dotted lines at 50.

Since the present invention is not concerned with the particular type of radiosonde circuitry, including the baroswitch and pressure-responsive capsule coacting therewith, these parts are not shown in detail. However, an example of the general type of telemetering circuitry involved herein may be found in the patent to Cosby, No. 2,558,342.

There is no set procedure for folding the box blank and securing the internal parts in assembled relation. In the example shown, after the blank has been folded into box shape, the duct members 28, 32 with the insulation pad assembled thereto are properly located in the box and at their upper and lower ends, around the intake and exhaust openings, the edges of the duct members are securely taped to the adjacent edges of the box, note Fig. 4. Following this, the section 37 is inserted in the intake of the duct 28′ and secured to the adjacent side walls of the box by the rivets 38′.

Referring now to the compartment 48 for the audio frequency section 47, this part is separated from the combined battery and storage compartment 46 by means of a partition member 55 (compare Figs. 6 and 4) having a downwardly bent flap 56 at one end thereof and an upwardly bent flap 57 at its opposite end, by means of which the partition may be readily inserted in the compartment and anchored to the adjacent side walls of the box. In practice, only the flap end 56 is secured to the adjacent end wall of the box, the opposite end being free for limited adjustment to accommodate components of varying size. The audio section 47 is assembled on an insulated base which is anchored to the partition 55 in any suitable manner. The holes indicated at 58, 58′ are to permit circulation of air between the compartments so that the temperature of the battery may be communicated to the audio section 47. The partition member 55 may take different forms or shapes to accommodate different types of circuitry, as will be apparent upon reference to Figs. 7 and 8. Even though the battery may be of the dry cell type, yet it does give off a certain amount of heat when connected in circuit; also it constitutes a relatively large mass which is at substantially room temperature when at ground level immediately preceding flight. If the battery is of the water-activated type, it may generate a relatively great amount of heat during flight. This heat is communicated to compartment 48 through the openings 58, 58′ in the partition 55 and tends to resist relatively sharp temperature changes which might otherwise occur as the radiosonde moves rapidly from ground level to high altitude. While the exterior walls 27 of the compartments 48, 46 are not provided with extra insulation such as the pad 31, yet said walls are formed of material which has a relatively high coefficient of insulation and they thus retard escape of heat therethrough from the said compartments.

The auxiliary duct or passage 31′ performs two important functions: (1) It constitutes an additional insulation factor for preventing the transmission of heat from the compartment 48 to the main air duct 28′. It is essential that an effective insulator be interposed between these areas otherwise errors in ambient air temperature measurement in the primary duct 28′ might occur. As altitude is gained and the pressure decreases, the movement of air through the main duct correspondingly decreases, and any artificial temperature effects tend to increase the error factor. The auxiliary passage 31′ coacts with the insulation pad 31 to effectively seal the main duct 28′ from such effects, since it constitutes a ventilating system by which heat passing through the wall 32 is carried off into the atmosphere. (2) It (passage 31′) also provides for a free circulation of air adjacent compartment 48 during flight, which action prevents the temperature in said compartment from rising to a point where a water-activated battery would overheat and short or the operation of other devices or circuitry be impaired. Primarily, the object here is to keep down the heat generated by a water-activated battery.

It will be noted from Fig. 1 that the door 13, 13′ which is hinged as a unit at 15, normally overlies both compartments 48 and 46. To prevent entrance of moisture into the compartment 48 and tampering with the audio section by unauthorized personnel after the said section has been carefully wired into the main circuit and adjusted, tape is applied over the adjacent or contiguous edges of the door 13 and box as indicated at 59, 59′. This may be done when preparing the radiosonde for flight. After the door 13 has been closed and secured in this manner, the door 13′ is still free to be opened and closed since it will then hinge about the score line 14 which is initially formed in the blank between the two doors. When the radiosonde is ready for flight, the battery is placed in the compartment 46 and connected in circuit and secured in closed position by means of a string 60, which engages a fastening element 61.

The compartment 46, which is closed by the door 13′, not only serves as a battery compartment for the radiosonde during flight, but it also functions as a storage compartment for the radio frequency section housing, indicated at 62, and the container 41″ for the humidity element 41 during shipment and storage of the radiosonde prior to flight and in the event of recovery and return of the instrument following flight. In practice, the housing 62 takes the form of a cylindrical, cone-ended member molded from plastic material. At its upper end the said housing is provided with a diametrically enlarged annulus 63, which forms a shoulder as at 63′, and when the housing is inserted in the socket defined by resilient holder 20, the shoulder is engaged by a bead 64 formed on the interior of said holder, whereby the housing is firmly and releasably held in suspended position from the bottom wall 18 of the box 10. The radio frequency section is wired on a panel which is inserted in the housing through the upper open end thereof, the particular type of panel and method of wiring the circuitry forming no part of the present invention. Not only does the holder 20 resiliently and removably support the housing 62, but it also provides an effective seal to prevent moisture from gaining access to the circuitry contained within the housing. The radio frequency section and audio frequency section are connected to one another during initial assembly through leads 65, Fig. 1, which are of sufficient length to permit the two sections to remain connected both during flight and storage of the instrument prior to and following flight.

*Preparation for shipment and storage*

In preparing the radiosonde for shipment and storage prior to flight, and also in the event of recovery of the instrument following flight, the housing 62 carrying the radio frequency section is disposed in the compartment 46 along with the container 41″ for the humidity element, and the door 13, 13′ is closed and secured by means of the string 60. The door 13 may be closed and sealed following assembly of the audio section in the compartment 48, or it may be sealed after the housing 62 and container 41″ have been inserted in the compartment 46. Fig. 4 illustrates how the parts may be disposed in the said compartment 46. Also, the top door 27′ is closed and secured by means of the cord 51 as is also the bottom door 25 by means of the cord 53.

At this point attention is directed to the advantage of locating the entrance to the auxiliary duct 32′ at the top of the box. This location not only simplifies the overall construction of the box but it also provides an opening which together with the main duct inlet opening may be controlled by common door 27'. The position of the temperature element 40 affects its accuracy of indication when the instrument is in flight, hence it is important that the said element be properly located at the factory by an experienced technician. Since the duct 28' is closed by the doors 27' and 25 during shipment and storage, such can be done with little or no chance of tampering by unauthorized personnel. Also, the doors 27' and 25 serve to protect the duct 28 against entrance of dust, dirt and other foreign matter.

In order to encourage return of the instrument should it be recovered by a civilian following flight, instructions are printed on the exterior of the box, informing how the door 13' may be opened, the battery removed and thrown away, and the housing 62 readily detached and placed in the compartment 46. Since the door 13 is sealed, there will be less chance of tampering with the audio section in the compartment 48.

*Preparation for flight*

In preparing the instrument for flight, the door 13' is opened and the container 41'' and housing 62 removed and replaced by a battery, which in the type of instrument shown in Figs. 1 to 4, inclusive, is a water activated battery and is therefore shipped and stored separate from the instrument. The housing 62 is then inserted in the holder 20. The doors 27' and 25 are opened and tied back so that the duct 28' and auxiliary duct 32' are open to the atmosphere at both ends. The baroswitch door 26 is closed and remains so at all times unless it is desired to gain access to the baroswitch for adjustment or corrective purposes.

*Figures 7 and 8*

Fig. 7 illustrates how the compartments 46 and 48 of the box 10, described in connection with Figures 1 to 6, inclusive, may be adapted for radiosondes of that type in which both the audio frequency and radio frequency sections are mounted on a common base. The box itself and the duct members assembled therein are similar in every respect to the box as previously described, and hence such parts, where shown, have been given like reference numerals. The only change is in the partitioning of the compartment 46, 48 and the method of installing the required insulation. The radio frequency and audio frequency portions of the transmitter are indicated at 66 and 67; they are both mounted on a common base 68. The member indicated at 69 is a so-called sinker for attachment to the antenna, not shown, in order to stabilize the latter during flight. In the position of the parts as shown in Fig. 7, the instrument is arranged for storage, the container 41'' for the humidity element or electric hygrometer being also stored in the compartment 46' along with the transmitter. The device indicated at 70 is a calibration chart for use in evaluating the baroswitch flight record. When the instrument is prepared for flight, parts 41'' and 70 are removed and replaced by a battery, which is then connected to the transmitter. The battery in this instance is a dry battery, and hence it is essential that it be shielded from the effects of excessively low temperatures, which is the purpose of the insulation 71. The partition which separates the transmitter circuitry compartment 48 from the battery and storage compartment 46' here takes the form of a rectangular box-shaped member 72 into which the transmitter is nested. The member 72 may be conveniently stamped from a strip of cardboard having a laterally-projecting flap which when folded provides a box having one side open and the opposite side closed.

The door 13, 13' is of the same construction as previously described except that it remains rigid as a single panel hinged at 15. Also, the inner side of the door is lined with the insulation material 71.

In Fig. 8 the box is adapted for radiosondes in which, while the radio frequency and audio frequency sections are separate or mounted on different panels or supports, the radio frequency section is not suspended from the box but remains in the box at all times along with the audio section. In this instance the audio frequency section is indicated at 73 and the radio frequency section at 74. The partition member 75 is made from a single strip of material such as cardboard folded so as to provide two separate compartments, one for the audio section and the other for the radio frequency section, and said partition member also separates the battery and storage compartment 46'' from the transmitter compartment 48''. In all other respects, the box remains the same as heretofore described.

In radiosondes of that type wherein the audio frequency and radio frequency sections are both housed within a housing such as that indicated at 62, the box herein disclosed will still adapt itself to this arrangement since in such types the compartments 48 and 46 provide storage compartments during shipment and prior to flight, while during flight compartment 46 serves as a battery compartment.

It will now be apparent that the radiosonde box or case as herein disclosed may be made from a foldable blank common to various types of radiosonde circuitry, while at the same time it provides a convenient storage space for the various components during shipment and storage, and when the radiosonde is in flight, it supports the said compartments in an effective manner and to their mutual advantage.

What is claimed is:

1. In a radiosonde, telemetering circuitry including a baroswitch and an associated audio frequency section and a radio frequency transmitter section, a container having interior walls providing an air duct open at both ends to the atmosphere when the radiosonde is in flight, said interior walls partitioning off the container into a first compartment adapted to receive the baroswitch and a second compartment adapted to receive said audio frequency section, a housing for said radio frequency section which is open at its one end for insertion of the said radio frequency section, said one end being also provided with an annular shoulder or enlargement, and a flexible socket member connected to the bottom wall of the box and provided with an interior annular bead adapted to engage said shoulder, said socket member serving to detachably support said housing from the bottom of the box during flight and also seal the open end of the housing.

2. In a radiosonde, telemetering circuitry including a baroswitch, an audio frequency section and a radio frequency section, a container having oppositely disposed top and bottom walls, end walls and side walls defining a box of prismatic form, duct members providing an air duct for condition-sensing means extending in a generally diagonal direction from the top to the bottom of the box and dividing the latter into a compartment for said baroswitch and another compartment adapted to receive associated circuitry such as said audio section, a partition in said circuitry compartment providing a sub-compartment which receives a battery during flight of the radiosonde and also serves as a storage compartment for the radio frequency section during shipment and storage of the radiosonde, a housing for said radio frequency section adapted to be suspended from the bottom wall of the box during flight, a flexible socket member connected to said bottom wall and adapted to detachably receive said housing, a door hinged to the one side wall of the box and depending over and serving as a closure for said circuitry compartment and said battery and storage sub-compartment, said door being made of foldable material and in two sections with a score line separating the door sections permitting the sub-compartment door section to be hinged on the circuitry compartment door section, and means for sealing off said circuitry compartment door section leaving the battery compartment accessible for storage of said radio frequency housing when the radiosonde is being shipped or placed in storage.

References Cited in the file of this patent

UNITED STATES PATENTS 2,347,160 Wallace ---------------- Apr. 18, 1944

2,352,578 Wallace ---------------- June 27, 1944
2,604,582 Hauck et al. ------------ July 22, 1952

OTHER REFERENCES

"An Improved Radiosonde Etc.," Diamond et al., Journal of Research of the National Bureau of Standards, vol. 25, September 1940.

"Instructions—Radiosonde Set AN/AMT—9A," Bendix Aviation Co., Fritz Div., Baltimore, Md., 1953.